(12) United States Patent
Shishido et al.

(10) Patent No.: US 6,474,067 B2
(45) Date of Patent: Nov. 5, 2002

(54) APPARATUS AND METHOD FOR RESOURCE RECOVERY FROM ORGANIC SUBSTANCE

(75) Inventors: Hiromu Shishido; Norio Omoda, both of Hiroshima (JP)

(73) Assignee: Chugoku Maintenance Co., Ltd., Hiroshima (JP)

( * ) Notice: Subject to any disclaimer, the term of this patent is extended or adjusted under 35 U.S.C. 154(b) by 0 days.

(21) Appl. No.: 09/772,892

(22) Filed: Jan. 31, 2001

(65) Prior Publication Data

US 2001/0011457 A1 Aug. 9, 2001

(30) Foreign Application Priority Data

Feb. 3, 2000 (JP) ........................ 2000-026876
Sep. 8, 2000 (JP) ........................ 2000-273826

(51) Int. Cl.⁷ .............................................. F01K 25/06
(52) U.S. Cl. ....................... 60/649; 60/653; 60/618; 60/670
(58) Field of Search ........................ 60/614, 616, 618, 60/649, 653, 670

(56) References Cited

U.S. PATENT DOCUMENTS

| | | | |
|---|---|---|---|
| 4,363,638 A | * 12/1982 | Mariani | 48/111 |
| 4,803,958 A | * 2/1989 | Erickson | 122/21 |
| 4,951,871 A | * 8/1990 | Hata et al. | 237/12.1 |
| 5,000,003 A | * 3/1991 | Wicks | 60/618 |
| 5,056,315 A | * 10/1991 | Jenkins | 60/614 |
| 5,327,987 A | * 7/1994 | Abdelmalek | 60/618 X |

FOREIGN PATENT DOCUMENTS

| | | |
|---|---|---|
| JP | 3-143343 | 6/1991 |
| JP | 4-13820 | 1/1992 |
| JP | 4-84081 | 3/1992 |

* cited by examiner

*Primary Examiner*—Hoang Nguyen
(74) *Attorney, Agent, or Firm*—Nixon Peabody LLP; Donald R. Studebaker

(57) ABSTRACT

In a gasification furnace, a combustible gas is generated from an organic substance for gasification containing biomass of organic wastes or the like. An engine of a cogeneration is operated using this combustible gas to generate electricity by an electric generator driven by the engine, and hot water is generated by heating water in a radiator. The hot water is heated by a superheated steam generator of a heat storage type utilizing the electric power from the electric generator to generate superheated steam. Furthermore, a dry-distilled gas and a carbide are generated by dry-distilling and carbonizing an organic substance for carbonization containing biomass of organic wastes or the like with this superheated steam in the carbonization furnace. Thus, the resources are recovered from the organic substances containing biomass of organic wastes or the like by gasifying or carbonizing the organic substances with the superheated steam.

28 Claims, 6 Drawing Sheets

APPARATUS AND METHOD FOR RESOURCE RECOVERY FROM ORGANIC SUBSTANCE

BACKGROUND OF THE INVENTION

The present invention relates to an apparatus and a method for resource recovery from organic substances such as organic wastes containing biomass (biological resource), utilizing superheated steam.

The inventors of the present invention have put their efforts to research and development of technologies for utilizing superheated steam to a high degree for many years, and have succeeded in development and commercialization of, for example, novel food processing methods and apparatuses that allow the characteristics of atmospheric pressured heated steam to be utilized as a food processing technique.

In recent years, under the circumstances that scientific and basic research regarding superheated steam is advancing, the inventors of the present invention found that organic wastes can be reduced by carbonization, utilizing various characteristics of the superheated steam as a thermal radiation gas, an anoxic gas and a reducing gas, and proposed a novel method for producing a carbide and an apparatus thereof, utilizing the characteristics of the superheated steam (see the specification and the drawings of Japanese Patent Application No. 11-309982)

Conventionally, various attempts for resource recovery from food wastes or the like have been made by pulverizing and drying food wastes or the like, and performing carbonization with a carbonizing apparatus and cooling for production into various carbonized products.

However, in this method, a regular fuel for the carbonizing apparatus is used, and food wastes or the like is carbonized by dry-distillation, utilizing the energy of the fuel. Therefore, this method has the following problems: There is a high possibility of generation of hazardous substances in the dry-distilled gas; Carbonization and cooling take a long time; A large amount of energy consumption is required; The apparatus is of a large-scale batch system, and the obtained carbonized products are expensive because of a high cost heat source.

On the other hand, to generate the superheated steam, conventionally, it is general that steam generated by a boiler is heated with a heater or the like to produce superheated steam controlled to a predetermined temperature.

To produce hot water with a high temperature, a boiler can be used, and it is also known that an electrically powered high temperature heat storage reservoir utilizing inexpensive night-time electricity is used and hot water is produced in the high temperature heat storage reservoir.

Thus, conventionally, various research and development have been made and many efforts have been reported, regarding the production of carbonized products by dry-distilling organic substances containing biomass (biological resources) of food wastes or the like with a carbonizing apparatus, the production of high temperature hot water by utilizing night-time electricity, utilization of the organic substances gasified in a large-scale gasification furnace as regular combustion energy or the like. However, these methods have various problems to be solved, such as treatment of hazardous substances contained in the dry-distilled gas, inefficiency of a large scale batch system, and much time and cost for the treatment. Therefore, there is a strong demand for solving these problems and developing a new system for resource recovery that immediately can be applied to resource recovery from organic substances.

Under these circumstances, the inventors of the present invention have studied hard to develop a new system that permits resource recovery from organic substances and consequently constructed a new system that converts energy obtained by gasifying organic resources to superheated steam and a new carbonizing system that carbonizes organic substances using the above system for resource recovery, and thus realized the present invention.

Thus, it is an object of the present invention to provide a new system for carbonization and resource recovery by carbonizing organic substances containing biomass for resource recovery by utilizing superheated steam.

It is another object of the present invention to provide a new system as a heat source for generating superheated steam.

It is still another object of the present invention to provide a new system for converting energy obtained by gasifying organic substances to superheated steam.

It is yet another object of the present invention to provide a new energy conversion system, utilizing a cogeneration including an engine that converts the energy from gasification to electric power and hot water.

Moreover, it is an object of the present invention to achieve effective utilization of the dry-distilled gas generated in a carbonizing furnace in the system for resource recovery by heating the organic substances in the superheated steam.

SUMMARY OF THE INVENTION

In order to achieve these objects, the present invention provides an apparatus for resource recovery from an organic substance for gasification containing biomass by converting energy obtained by gasifying the organic substance for gasification to superheated steam. The apparatus of the present invention includes a gasification furnace for generating a combustible gas containing at least one of hydrogen and carbon monoxide from the organic substance for gasification; a cogeneration including an engine that uses the combustible gas generated by the gasification furnace as a fuel, an electric generator driven by the engine, and a radiator for generating hot water by heating water by cooling the engine; and superheated steam generating means for generating superheated steam from the hot water generated by the radiator of the cogeneration. The superheated steam generated by the superheated steam generating means is supplied to another apparatus.

Furthermore, the apparatus of the present invention may include a carbonization furnace for generating a dry-distilled gas and a carbide by heating an organic substance for carbonization containing biomass in the superheated steam generated by the superheated steam generating means.

In the above invention, in the gasification furnace, a combustible gas is generated from the organic substance for gasification containing biomass, and this combustible gas is supplied to the cogeneration. In the cogeneration, the combustible gas from the gasification furnace is combusted in the engine, so that the engine is operated. This engine drives an electric generator to output electric power, and water is heated by heat exchange in the radiator to produce hot water. In the superheated steam generating means, atmospheric pressured superheated steam is generated from the hot water produced by the radiator of the cogeneration, and this superheated steam is supplied to another apparatus. Furthermore, the superheated steam generated by the superheated steam generating means is supplied to the carbonization furnace, and in this carbonization furnace, an organic substance for carbonization containing biomass is heated in the superheated steam so that a dry-distilled gas and a carbide are generated. Therefore, the present invention provides the following distinguished advantages: (1) A novel system for carbonizing organic substances for resource recovery utilizing superheated steam can be obtained; (2) A conventional treatment of organic substances containing biomass commonly is performed by combustion, which causes problems such as air pollution due to exhaust gas, whereas the present invention can convert energy obtained in the system directly to superheated steam, which is clean and low cost, and can recover the organic substances as the superheated steam without generating hazardous substances; (3) A new system for converting energy obtained by gasifying organic wastes to superheated steam can be obtained; (4) Since the cogeneration allows high-output energy to be collected with a generated gas with a lower calorie than that of town gas, the gasification. furnace can be small; (5) Since the superheated steam can be generated and supplied without using a boiler or the like, the apparatus can be small; (6) A new system for treating organic substances free from combustion can be obtained; and (7) It is expected that the present invention will be the main stream of treatment of organic substances as an environment friendly treatment system.

Furthermore, similarly, the present invention provides an apparatus for resource recovery by carbonizing an organic substance for carbonization containing biomass with superheated steam. The apparatus of the present invention includes a cogeneration including an engine that uses a combustible gas containing at least one of hydrogen and carbon monoxide as a fuel, an electric generator driven by the engine, and a radiator for generating hot water by heating water by cooling the engine; superheated steam generating means for generating superheated steam from the hot water generated by the radiator of the cogeneration; and a carbonization furnace for generating a dry-distilled gas and a carbide by heating the organic substance for carbonization in the superheated steam generated by the superheated steam generating means and generating the combustible gas by heating the carbide in the superheated steam.

In this invention, similarly to the above invention, when a combustible gas containing at least one of hydrogen and carbon monoxide is supplied to the cogeneration, the combustible gas is combusted in the engine of the cogeneration, so that the engine is operated. This engine drives an electric generator to output electric power. Moreover, water is heated by heat exchange in the radiator to produce hot water. In the superheated steam generating means, atmospheric pressured superheated steam is generated from the hot water produced by the radiator of the cogeneration, and this superheated steam is supplied to the carbonization furnace, and in this carbonization furnace, an organic substance for carbonization is heated by the superheated steam at an anoxic state, a low temperature, and a high calorie for dry-distillation and carbonization to generate a dry-distilled gas and a carbide. Then, the carbide carbonized in this carbonization furnace is further heated by the superheated steam and gasified. Thus, the combustible gas is generated, and this combustible gas and the dry-distilled gas are supplied to the engine of the cogeneration. Therefore, the present invention allows the dry-distilled gas to be harmless by heating the dry-distilled gas in the engine in the cogeneration. Moreover, the combustible gas that can be used as a fuel for the engine of the cogeneration is generated from the generated carbide in the carbonization furnace. Thus, the carbonization furnace also serves as the gasification gas, and therefore the apparatus can be small.

Furthermore, the superheated steam generating means is constituted by an electrically powered superheated steam generator that uses electric power generated by the electric generator of the cogeneration as heating energy. In other words, the electrically powered superheated steam generator allows the electric power generated by the electric generator of the cogeneration to be used as the heating energy to generate the superheated steam from the hot water generated by the radiator of the same cogeneration, and thus the electric power can be utilized effectively, and energy saving can be achieved.

Furthermore, the superheated steam generating means may be constituted by a combustion type superheated steam generator that generates superheated steam from hot water by combusting the dry-distilled gas generated in the carbonization furnace. In the combustion type superheated steam generator, the dry-distilled gas generated in the carbonization furnace at the same time of the carbonization of the organic substance is combusted, and this combustion generates the superheated steam from hot water generated by the radiator of the cogeneration. Thus, the dry-distilled gas can be combusted, so that the dry-distilled gas is effectively utilized as the heat energy for generation of the superheated steam and become harmless.

Furthermore, the superheated steam generating means may be constituted by both the combustion type superheated steam generator and the electrically powered superheated steam generator. By using both the electrically powered superheated steam generator and the combustion type superheated steam generator, the ability of generating the superheated steam can be improved.

In this case, the carbonization furnace may be configured so as to heat superheated steam using at least one of an exhaust gas from the engine of the cogeneration and an exhaust gas from the combustion type superheated steam generator as a heat source. With this invention, at least one of an exhaust gas generated by combustion of the dry-distilled gas in the combustion type superheated steam generator and an exhaust gas generated by combustion of a combustible gas in the engine of the cogeneration is supplied to the carbonization furnace, and the superheated steam is heated by the heat of the exhaust gas in the carbonization furnace. Thus, the heat energy of the exhaust gas generated by the combustion of the dry-distilled gas and/or the combustible gas can be effectively utilized as the heat source in the carbonization furnace, so that the dry-distillation and the carbonization of the organic substances with the superheated steam in the carbonization furnace can be facilitated.

It is preferable that the electrically powered superheated steam generator is of a heat storage type where a heat transfer pipe and an electric heater are provided in a high temperature heat storage reservoir having a heat storage material.

It is preferable that the combustion type superheated steam generator combusts the dry-distilled gas together with another fuel. This invention improves the heating ability of the combustion type superheated steam generator.

Furthermore, the apparatus of the present invention may include cooling means for generating acetic acid by cooling the dry-distilled gas generated in the carbonization furnace. Thus, the dry-distilled gas generated at the same time of the carbonization of the organic substance in the carbonization furnace is cooled by the cooling means, and this cooling generates acetic acid. Therefore, the dry-distilled gas can be effectively utilized by converting it to acetic acid. Thus, acetic acid can be produced from the organic substance easily, and the dry-distilled gas can be harmless.

Furthermore, at least a part of the carbide generated by the carbonization furnace may be supplied to the gasification furnace. This invention makes it possible to reuse the carbide generated in the carbonization furnace, and effective utilization of the carbide and energy saving can be achieved.

The apparatus of the present invention may include an exhaust gas boiler for generating saturated steam by heating hot water generated by the radiator of the cogeneration with an exhaust gas from the engine. This invention can generate steam by heating the hot water with the exhaust gas from the engine, so that further effective utilization of the exhaust gas and energy saving can be achieved.

It is preferable that the engine of the cogeneration is a rotary engine. More specifically, even if the combustible gas generated in the gasification furnace or the carbonization furnace has a lower calorie than that of town gas, the rotary engine can use the combustible gas as the fuel without a combustion improver. Thus, the rotary engine is suitable for combusting the combustible gas generated in the gasification furnace or the carbonization furnace.

It is preferable that the carbonization furnace is a continuous type carbonization furnace. This invention provides a carbonization furnace suitable to the system of the present invention.

It is preferable that the apparatus of the present invention includes granulating means for previously molding the organic substance for carbonization into granules before being fed to the carbonization furnace. In this invention, the organic substance containing biomass is fed to the carbonization furnace in the form of granules, and therefore the passage properties and the contact properties of the superheated steam with respect to the organic substance is high in the carbonization furnace. Thus, the carbonization of the organic substance can be performed efficiently. In addition, since the granular organic substance is carbonized keeping its form, the generated carbide can be granular, so that the handling properties can be improved.

The organic substance for gasification to be fed to the gasification furnace is at least one selected from the group consisting of organic resources, carbides, wood and other organic wastes. The organic substance for carbonization to be fed to the carbonization furnace is at least one selected from the group consisting of agricultural wastes including chaff and straw, livestock wastes including fowl droppings and droppings of pigs and cattle, forestry wastes including lumber from thinning, waste wood and bamboo, industrial wastes discharged in a food production process, a brew process or a lumber production process, domestic wastes including food refuse, domestic garbage and waste edible oil, organic resources, waste rubber materials and resins including fiber reinforced resins.

Furthermore, electric power generated by the electric generator of the cogeneration may be supplied to the outside. This invention makes it possible to supply electric power easily by utilizing the energy from gasification of the organic substance.

Furthermore, it is preferable that the temperature of the superheated steam when generating a carbide from the organic substance for carbonization in the furnace for carbonization is 400° C. or less.

According to another aspect of the present invention, a method for resource recovery by carbonizing an organic substance for carbonization containing biomass with superheated steam for resource recovery includes a gasification step of generating a combustible gas containing at least one of hydrogen and carbon monoxide from an organic substance for gasification containing biomass; a cogeneration step of operating an engine of a cogeneration using the combustible gas as a fuel to drive an electric generator by the engine and generating hot water by heating water in a radiator; a superheated steam generation step of generating superheated steam from the hot water generated by the radiator; and a carbonization step of generating a dry-distilled gas and a carbide by heating the organic substance for carbonization in the superheated steam.

Furthermore, similarly, a method for resource recovery by carbonizing an organic substance for carbonization containing biomass with superheated steam for resource recovery includes a cogeneration step of operating an engine of a cogeneration using a combustible gas containing at least one of hydrogen and carbon monoxide as a fuel to drive an electric generator by the engine and generating hot water by heating water in a radiator; a superheated steam generation step of generating superheated steam from the hot water generated by the radiator; and a carbonization step of generating a dry-distilled gas and a carbide by heating the organic substance for carbonization in the superheated steam and generating a combustible gas by heating the carbide.

These methods provide the same effects as above, and resource recovery from organic substances containing biomass can be achieved efficiently.

In the superheated steam generation step, the superheated steam may be generated from the hot water using electric power generated by the electric generator of the cogeneration as heating energy. In this case, similarly to the above invention, the superheated steam is generated from the hot water generated by the radiator of the cogeneration using the electric power generated by the electric generator of the cogeneration as the heating energy. Thus, the electric power can be effectively utilized, so that energy saving can be achieved.

Furthermore, in the superheated steam generation step, the superheated steam can be generated from hot water by combustion of the dry-distilled gas generated in the carbonization step as the heating energy. In this invention, the dry-distilled gas generated at the same time of the carbonization of the organic substance in the carbonization step can be combusted so that the dry-distilled gas can be effectively utilized as heat energy for generation of the superheated steam and also become harmless.

Furthermore, it is preferable that at least a part of the carbide generated in the carbonization step is used as a carbide in the gasification step. Thus, the carbide generated in the carbonization step is reused in the gasification step so that effective utilization of the carbide and energy saving can be achieved.

In the superheated steam generation step, the saturated steam may be generated by heating hot water generated by the radiator of the cogeneration with an exhaust gas from the engine. In this invention, since steam can be generated by heating hot water with the exhaust gas from the engine, further effective utilization of the exhaust gas and energy saving can be achieved.

It is preferable that the organic substance for carbonization is previously molded into granules before being heated with the superheated steam in the carbonization step. In this invention, since the organic substance containing biomass is heated in the form of granules, the passage properties and the contact properties of the superheated steam with respect to the organic substance are high in the carbonization step. Thus, the carbonization of the organic substance can be performed efficiently, and the handling properties can be improved.

The organic substance for gasification used for generating the combustible gas in the gasification step is at least one selected from the group consisting of organic resources, carbides, wood and other organic wastes. Furthermore, the organic substance for carbonization heated in the carbonization step is at least one selected from the group consisting of agricultural wastes including chaff and straw, livestock wastes including fowl droppings and droppings of pigs and cattle, forestry wastes including lumber from thinning, waste wood and bamboo, industrial wastes discharged in a food production process, a brew process or a lumber production process, domestic wastes including food refuse, domestic garbage and waste edible oil, organic resources, waste rubber materials and resins including fiber reinforced resins.

Furthermore, it is preferable that the temperature of the superheated steam when generating a carbide from the organic substance for carbonization in the carbonization step is 400° C. or less.

This and other advantages of the present invention will become apparent to those skilled in the art upon reading and understanding the following detailed description with reference to the accompanying figures.

DETAILED DESCRIPTION OF THE INVENTION

Hereinafter, examples of the present invention will be described with reference to the accompanying drawings.

EXAMPLE 1

Figure 1:
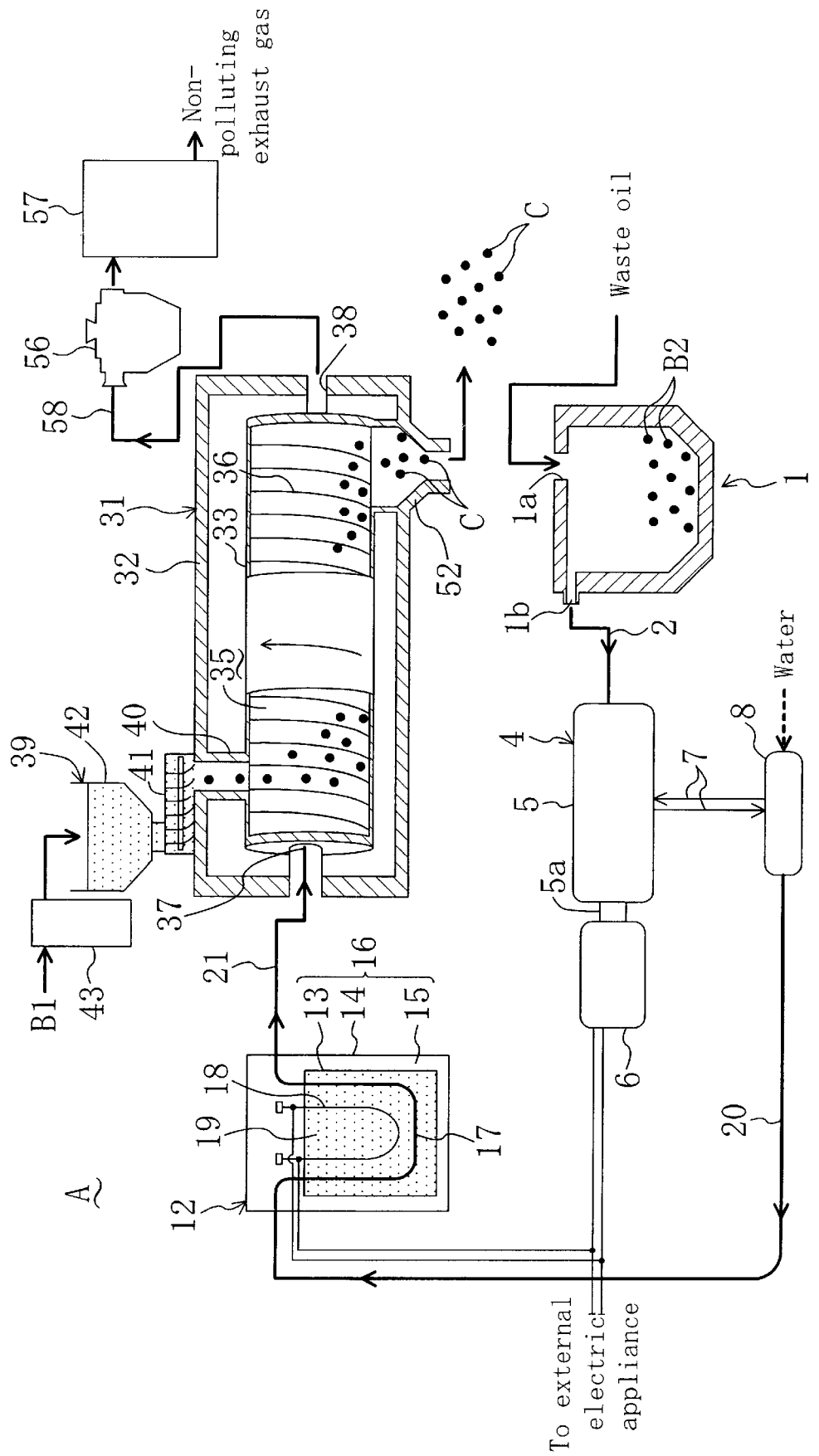
FIG. 1 is a view showing an apparatus for resource recovery from organic substances of Example 1 of the present invention.

FIG. 1 shows an entire structure of an apparatus A for resource recovery from organic substances of Example 1 of the present invention. The apparatus A for resource recovery is designed to heat and carbonize an organic substance B1 for carbonization containing biomass (biological resource) with atmospheric or low pressured superheated steam for resource recovery.

Examples of the organic substance B1 for carbonization include wastes, organic resources, waste rubber materials, and resins. Examples of the wastes include (1) agricultural wastes, (2) livestock wastes, (3) forestry wastes, (4) industrial wastes and (5) domestic wastes. Typical examples of agricultural wastes (1) include chaff, rice straw, and wheat straw. Typical examples of livestock wastes (2) include fowl droppings, droppings of pigs, cattle or the like. Typical examples of forestry wastes (3) include lumber from thinning, waste wood, forest remaining wood, and bamboo. Typical examples of industrial wastes (4) include various kinds of organic food wastes discharged in the food production process, and organic wastes such as strained lees of soy sauce or sake discharged in the brew process of soy sauce or sake. Typical examples of domestic wastes (5) include food refuse and waste edible oil discharged from houses or restaurants as garbage. Examples of waste rubber materials include waste tires and waste belts. Typical examples of resins include waste vinyl chloride, and a waste ship molded with FRP (fiber reinforced plastic). The organic substance for carbonization B1 to be used in the present invention is not limited the above-listed examples, but the present invention can be used for other suitable examples. At least one of these examples is heated under superheated steam for resource recovery.

The apparatus A for resource recovery includes a gasification furnace 1, a cogeneration 4, an electrically powered superheated steam generator 12 as superheated steam generating means, and continuation type carbonization furnace 31 as main elements. The gasification furnace 1 is of a so-called self-combusting system, and includes an inlet 1a and a gas outlet 1b. An organic substance for gasification B2 supplied to the furnace from the inlet 1a is gasified, and a combustible gas including at least one of hydrogen ($H_2$) and carbon monoxide (CO) is produced from the organic substance for gasification B2. Then, the combustible gas is discharged from the gas outlet 1b. The organic substance for gasification B2 contains biomass, and at least one selected from, for example, organic resources, organic wastes, wood and other organic wastes can be used suitably regardless of the type of the wastes. Such an organic substance B2 is pulverized or minced as appropriate with an introducing apparatus that is not shown, dehydrated and dried, and then introduced into the gasification furnace 1 from the inlet 1a. As the gasification furnace 1, any suitable gasification furnace can be used, as long as it is small and can supply a gas component for driving a rotary engine 5, which will be described later, of the cogeneration 4.

Residue from the gasification treatment of the organic substance for gasification B2 in the gasification furnace 1 becomes ashes and is disposed of.

In this gasification furnace 1, if necessary for facilitating generation of a combustible gas, waste oil (e.g., oil produced together with food wastes in food processing) can be introduced to the organic substance for gasification B2 without any treatment or after purification.

The cogeneration 4 includes a rotary engine 5, an electric generator 6 and a radiator 8. The rotary engine 5 has an intake passage (not shown) connected to the gas outlet 1b of the gasification furnace 1 through a pipe 2, and combusts the combustible gas produced in the gasification furnace 1 as a fuel with drawn air. The electric generator 6 is driven by an output shaft 5a of the engine 5. The radiator 8 is in communication with a cooling water passage (not shown) of the engine 5 through a water passage 7, and heats water by cooling the engine 5 to produce hot water. A purification apparatus for purifying the combustible gas from the gasification furnace 1 can be provided in some point in the gas pipe 2.

A reciprocating engine or the like can be used as the engine 5, but a rotary engine can be used preferably. As the cogeneration 4, gas cogeneration in a rotary engine system configured to use the rotary engine 5 as the engine and include the regular radiator 8 and the electric generator 6 is preferable.

The output of the electric generator 6 is connected to an electric heater 18, which will be described later, in the electrically powered superheated steam generator 12 and an electric appliance (not shown) outside the apparatus A for resource recovery. This makes the resource recovery apparatus A constitute a part of a power supply apparatus that supplies electric power with the electric generator 6 of the cogeneration 4. A plurality of cogenerations 4 can be provided, if necessary.

The electrically powered superheated steam generator 12 constitutes superheated steam generating means for generating superheated steam by heating hot water produced by the radiator 8 of the cogeneration 4. This superheated steam generator 12 is of a heat storage type that heats hot water from the radiator 8 using electric power generated by the electric generator 6 of the cogeneration 4 as the heating energy. More specifically, the superheated steam generator 12 includes a high temperature heat storage reservoir 16 that is insulated by filling an insulating material 15 (heat retaining material) between dual (inner and outer) casings 13 and 14. The insulating material 15 is made of rock wool or a porous insulating material including silicon oxide/titanium oxide as main components, and inserted between the inner and outer casings 13 and 14 and filled therebetween.

A heat-transfer pipe 17 and an electric heater 18 are provided in the inner casing 13. The heat-transfer pipe 17 is connected to the radiator 8 of the cogeneration 4 via a hot water pipe 20, and hot water from the radiator 8 passes through the heat-transfer pipe 17.

In the inner casing 13, a heat storage material 19 for storing heat energy of the electric heater 18 is filled. Examples of the heat storage material 19 include nitrates, and more specifically, a mixed agent of magnesia in clinker form and sodium nitrate, sodium nitrite and/or potassium nitrate is preferable. This nitrate is melted at 142° C. or higher and becomes liquid.

The electric heater 18 is connected to the electric generator 6 of the cogeneration 4. The electric power of the electric generator 6 is supplied to the electric heater 18 so as to heat the heat storage material 19, for example, to about 500° C. Thus, heat energy is stored in the heat storage material 19, and hot water in the heat transfer pipe 17 is heated by the heat energy of the heat storage material 19 so as to generate superheated steam. It is possible to heat further the superheated steam with another heater or the like, if necessary. This allows atmospheric or low pressured superheated steam, for example with about 100 to 900° C. to be generated. Alternatively, night-time electricity from commercial power supply can be supplied to the electric heater 18 of the electrically powered superheated steam generator 12 as electric power for initiating first heat storage at the start of the operation of the apparatus A for resource recovery or electric power for backup.

The superheated steam generated in the electrically powered superheated steam generator 12 (superheated steam generating means) is supplied to the carbonization furnace 31 via a superheated steam pipe 21. This carbonization furnace 31 is a continuous type carbonization furnace that generates a dry-distilled gas and a carbide C by heating the organic substance for carbonization B1 in the superheated steam from the superheated steam generator 12 for dry-distillation and carbonization. The carbonization furnace 31 includes a dual structured housing of an outer housing 32 and an inner housing 33 that is provided within the outer housing 32. The space in the inner housing 33 is constituted by a treatment chamber 35. The treatment chambers 35 accommodates a net conveyer 36 that conveys the organic substance BI while being rotated by driving means (not shown) (in this case, this driving means can utilize the electric power generated in the cogeneration 4 as the driving power). An inlet 37 for superheated steam in communication with the electrically powered superheated steam generator 12 via the superheated steam pipe 21 is opened at the inlet end (the left end in FIG. 1) of both ends of the inner housing 33, corresponding to the starting end of the conveyer 36. An outlet 38 for generated gas is opened at the outlet end (the right end in FIG. 1) of both ends of the inner housing 33, corresponding to the terminal of the conveyer 36.

Furthermore, an organic substance feeding apparatus 39 for feeding the organic substance for carbonization B1 is provided at the starting end of the conveyer 36, which is at the inlet end of the treatment chamber 35 in the inner housing 33 in the carbonization furnace 31. More specifically, an organic substance feeding chute 40 for feeding the organic substance B1 from the outside of the outer housing 32 into the inner housing 33 from the upper side of its inlet end is provided between the upper walls of the outer and the inner housing 32 and 33, while penetrating the outer and the inner housings 32 and 33. The upper opening of the organic substance feeding chute 40 is connected to the outlet of a screw conveyer 41, and a hopper 42 is connected to the inlet of the screw conveyer 41, and a crusher 43 is connected to the hopper 42. The organic substance for carbonization B1 is crushed with the crusher 43 and dried, and then fed into the hopper 42. The organic substance B1 is conveyed by the screw conveyer 41, and supplied from the organic substance feeding chute 40 in the carbonization furnace 31 to the treatment chamber 35 in the inner housing 33.

On the other hand, a carbide collecting chute 52 for collecting a carbide C generated from the organic substance B1 in the treatment chamber 35 is provided between the lower walls of the outer and the inner housing 32 and 33, while penetrating the outer and the inner housings 32 and 33.

The organic substance for carbonization B1 fed into the inlet end of the treatment chamber 35 in the inner housing 33 through the organic substance feeding chute 40 is conveyed to the outlet end by the net conveyer 36. In the process of the conveyance, the organic substance B1 is heated stepwise in multi-stages in a reducing atmosphere without oxygen with the superheated steam introduced from the superheated steam inlet 37 for dry-distillation and carbonization. Thus, a dry-distilled gas and a carbide C are generated from the organic substance for carbonization B1, and the carbide C is collected from the carbide collecting chute 52, and the dry-distilled gas is collected from the generated gas outlet 38. In other words, the apparatus A for resource recovery constitutes a part of a production apparatus for producing the carbide C as a product with the carbonization furnace 31. It is preferable that the temperature of the superheated steam necessary to generate the carbide C from the organic substance for carbonization B1 is 400° C. or less in the carbonization furnace 31.

As the carbonization furnace 31, a continuous type as described above is preferable, but this is only illustrative, and other types of carbonization furnaces can be used, as long as it utilizes the superheated steam as the heat source.

An exhaust gas passage 58 provided with a dust collector 56 and a filter 57 is connected to the generated gas outlet 38 in the carbonization furnace 31, and the dry-distilled gas generated together with the carbide C in the carbonization furnace 31 is passed through the dust collector 56 and the filter 57 to be made a nontoxic gas.

Next, a method for resource recovery by carbonizing the organic substance for carbonization B1 with the superheated steam when the apparatus A for resource recovery of this example is in steady operation will be described. First, an organic substance for gasification B2 is fed to the gasification surface 1 through the inlet 1a, and a combustible gas containing at least one of hydrogen and carbon monoxide is generated from the organic substance for gasification B2 in the gasification furnace 1 (gasification process). In this case, waste oil can be mixed with the organic substance for gasification B2 to be fed to the carbonization furnace 31. This is advantageous for facilitating the generation of the combustible gas.

The combustible gas generated in the gasification furnace 1 is supplied to the cogeneration 4 through the gas pipe 2 after being discharged from the gas outlet 1b. In the cogeneration 4, the rotary engine 5 is operated, using the combustible gas from the gasification furnace 1 as the fuel, and the electric generator 6 is driven by the engine 5 to output electric power. In addition, water is heated by heat exchange in the radiator 8 to produce hot water (cogeneration process). A part of the electric power generated by the electric generator 6 of the cogeneration 4 is output to the electric heater 18 of the electrically powered superheated steam generator 12, as described later, and the remaining power is output to various electric appliances outside the apparatus A for resource recovery and utilized as power source.

In this case, the engine of the cogeneration 4 is a rotary engine 5, so that even if the combustible gas generated in the gasification furnace 1 has a lower calorie than that of town gas, the combustible gas can be used as a fuel without using a combustion improver, and the combustible gas can be combusted without any problems. Thus, this engine allows high output, compared with a reciprocating engine, and the electric power can be increased based on its engine output, and the temperature of hot water can be increased. Thus, clean and low cost energy can be generated.

The hot water produced by the radiator 8 of the cogeneration 4 is supplied to the electrically powered superheated steam generator 12 and heated so that atmospheric or low pressured superheated steam with about 100 to 900° C. is generated (superheated steam generation process). More specifically, in the electrically powered superheated steam generator 12, the electric heater 18 is heated by the electric power generated by the electric generator 6 of the cogeneration 4 so that the heat energy is stored in the heat storage material 19. Then, hot water in the heat transfer pipe 17 is heated by the heat energy of the heat storage material 19, and thus superheated steam is generated.

In this case, in the electrically powered superheated steam generator 12, the electric power generated by the generator 6 of the cogeneration 4 is used, and therefore energy-saving can be achieved by effective utilization of the electric power. In other words, the electrically powered superheated steam generator 12 basically utilizes the electric power and the hot water supplied by the cogeneration 4, and the hot water can be converted to the superheated steam. Thus, the heat energy obtained with in the whole system can be converted directly to the superheated steam.

The superheated steam generated in the electrically powered superheated steam generator 12 is supplied to the inlet end of the treatment chamber 35 in the inner housing 33 in the continuous type carbonization furnace 31. In this carbonization furnace 31, the organic substance for carbonization B1 is fed to the treatment chamber 35 in the inner housing 33 with the organic substance feeding apparatus 39. This organic substance B1 is heated for dry-distillation and carbonization with the superheated steam in a reducing atmosphere without oxygen at a low temperature and a high calorie (combination of sensible heat and the heat of evaporation (latent heat)) while being conveyed by rotation of the net conveyer 36, so that the dry-distilled gas and the carbide C are generated (carbonization process).

The carbide C generated in the carbonization furnace 31 is collected through the carbide collecting chute 52 out of the carbonization furnace 31. Thereafter, this carbide C is cooled to be made into a product for use for various purposes. Thus, the organic substance B1 is carbonized to be made into the carbide C as a product. In other words, resource recovery from a part of the organic substance B1 is achieved as the carbide C.

On the other hand, the dry-distilled gas generated by dry-distillation of the organic substance B1 in the carbonization furnace 31 is collected from the generated gas outlet 38. This dry-distilled gas is passed through the dust collector 56 and the filter 57 to be made a nontoxic gas.

In this example, to heat the organic substance B1 in the carbonization furnace 31 to generate the carbide C, atmospheric or low pressured superheated steam having the characteristics of a thermal radiation gas, an anoxic gas and a reducing gas is used as the heat source. Therefore, compared with a carbonization process with a combustion gas generated by combustion of a fuel, there is no concern that a hazardous substance such as dioxin proper to the combustible gas is generated in the generated dry-distilled gas. Moreover, a carbonization time is short, and a continuous process with an anoxic gas is easy, so that the apparatus can be compact. In addition, there is no problem concerning air pollution caused by exhaust gas. Thus, the present invention has excellent advantages in that a new treatment system for organic wastes can be provided in place of a conventional incineration system.

Furthermore, the gasification furnace 1 can be small, because the requirement of the gasification furnace is such a low level as to generate a combustible gas containing hydrogen and carbon monoxide and having a gas component that can drive the rotary engine 5.

A part or the whole of the carbide C generated in the carbonization furnace 31 may be supplied to the gasification furnace 1 as the organic substance for gasification B2 before or after cooling so that a combustible gas can be generated from the carbide C (the organic substance for gasification B2). This carbide C generated in the carbonization furnace 31 can be reused for the gas generation in the gasification furnace 1 so that effective utilization of the carbide C and energy saving can be achieved. In addition, for example, when the carbide C generated in the carbonization furnace 31 is difficult to distribute on the market without any modification, for example, when the organic substance for carbonization B1 is strained lees of soy sauce, and the carbide C generated therefrom contains a residual salt component, the carbide C can be used in the gasification treatment in the gasification furnace 1 rather than being commercialized.

EXAMPLE 2

Figure 2:
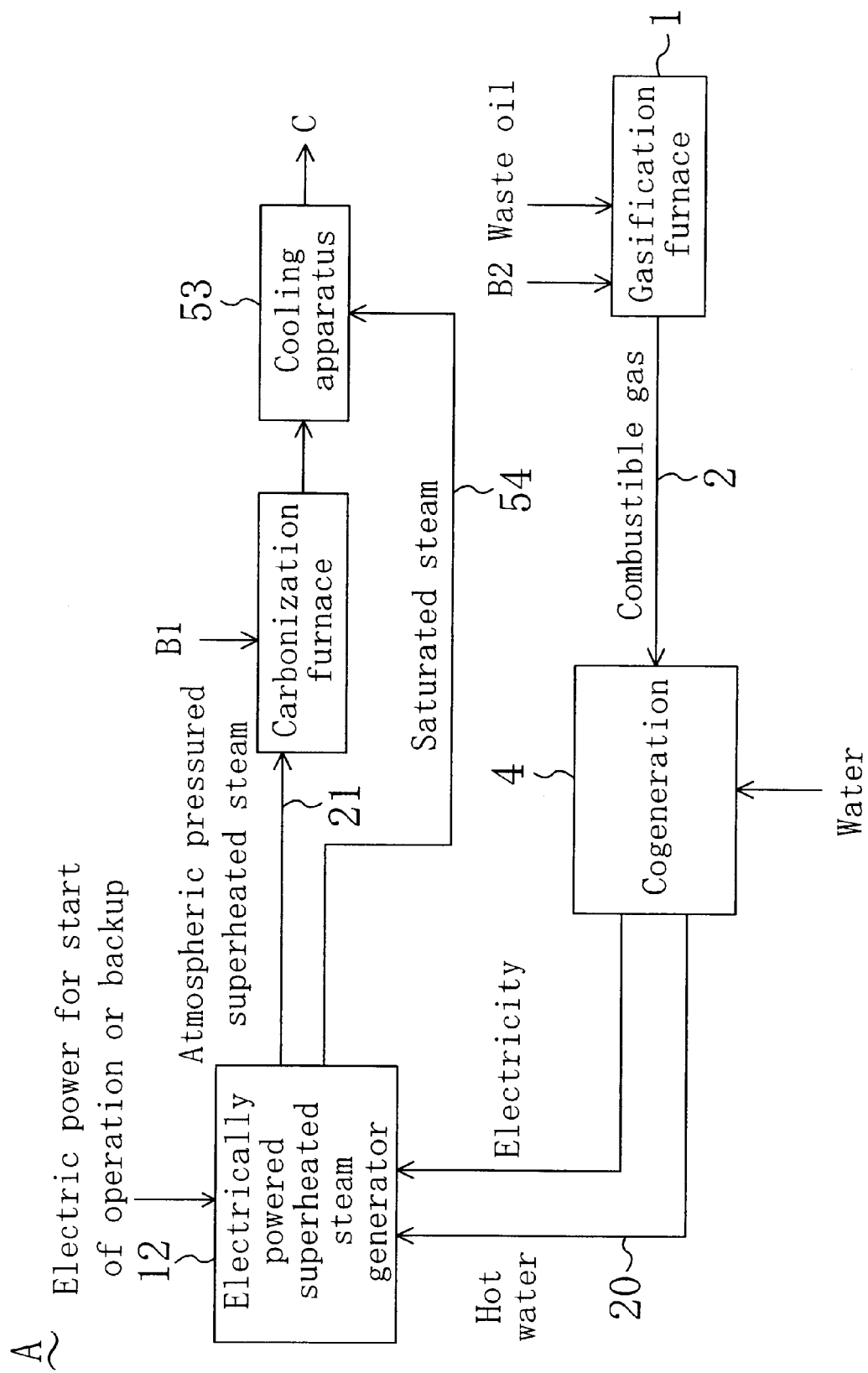
FIG. 2 is a schematic view showing an apparatus for resource recovery from organic substances of Example 2.

FIG. 2 shows Example 2 of the present invention (in the following examples, the same elements as those in FIG. 1 bear the same reference numerals, and the detailed description thereof will be omitted). In Example 2, a cooling apparatus for cooling the carbide C generated in the carbonization furnace 31 is provided In this example, the cooling apparatus 53 is connected to the carbide collecting chute 52 in the carbonization furnace 31. Furthermore, in the electrically powered superheated steam generator 12, saturated steam as well as the superheated steam are generated. The saturated steam outlet of the electrically powered superheated steam generator 12 are connected to the cooling apparatus 53 via a saturated steam pipe 54, and the saturated steam generated in the electrically powered superheated steam generator 12 is supplied to the cooling apparatus 53. Thus, the carbide C generated in the carbonization furnace 31 is cooled with the saturated steam. The structure other than that is the same as that of Example 1. Therefore, in this example, the saturated steam generated in the electrically powered superheated steam generator 12 can be utilized effectively for cooling the carbide C in the carbonization furnace 31.

EXAMPLE 3

Figure 3:
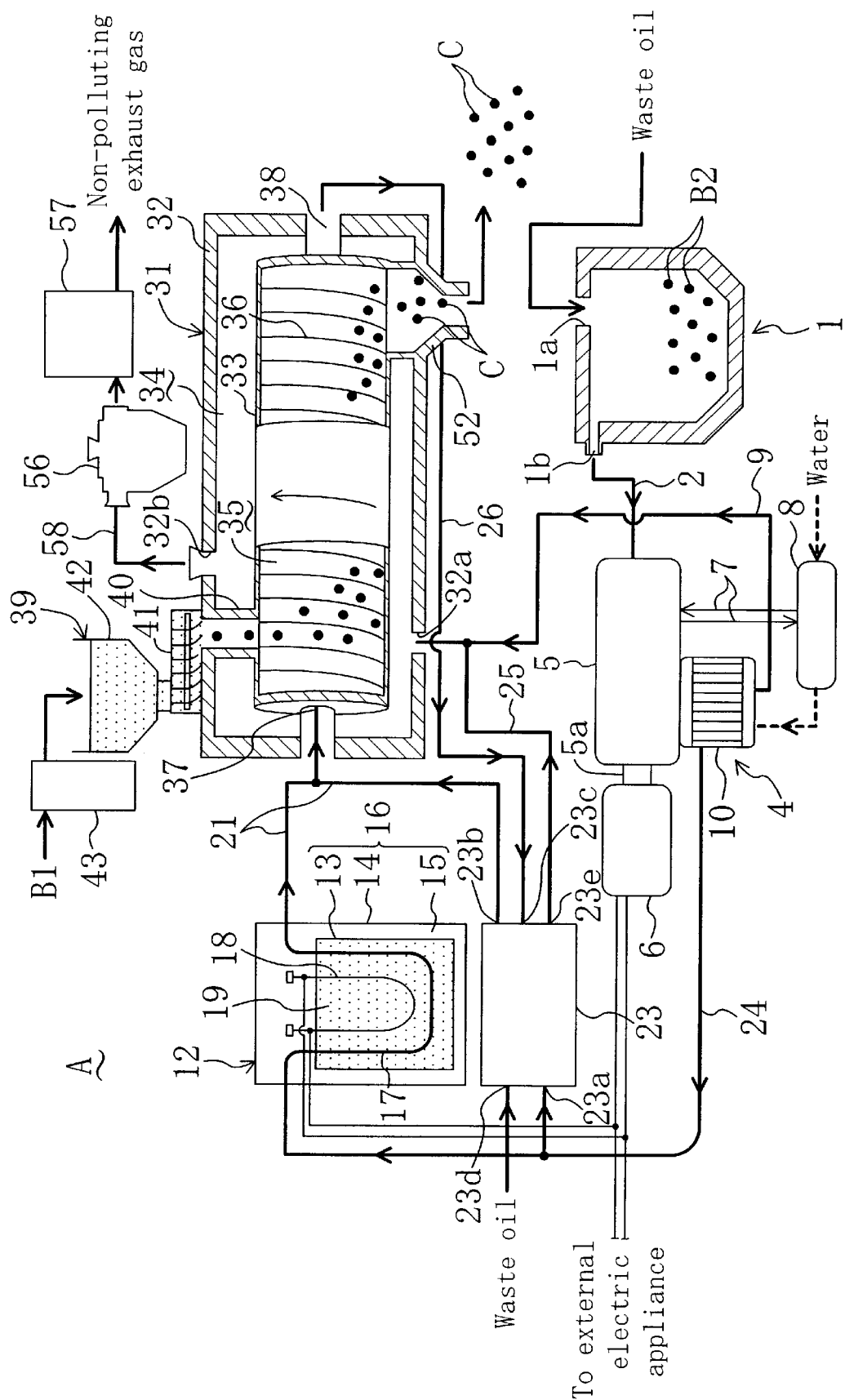
FIG. 3 is a view showing an apparatus for resource recovery from organic substances of Example 3, corresponding to that shown in FIG. 1.

FIG. 3 shows Example 3. In this example, in the cogeneration 4, an exhaust gas boiler 10 for discharging an exhaust gas of the engine 5 is provided in some point of an exhaust gas passage 9. This exhaust gas boiler 10 also functions as a silencer (noise eliminator) for eliminating noise caused by the combustion of the engine 5. In the exhaust gas boiler 10, hot water generated by the radiator 8 is heated by heat exchange with a high temperature exhaust gas from the engine 5 to generate saturated steam from the hot water.

The superheated steam generating means is a combination of the electrically powered superheated steam generator 12 of a heat storage type as described in Example 1 and a combustion type superheated steam generator 23. The electrically powered superheated steam generator 12 and the combustion type superheated steam generator 23 are connected to the exhaust gas boiler 10 of the cogeneration 4 via the saturated steam pipe 24. In the electrically powered superheated steam generator 12 and the combustion type superheated steam generator 23, the saturated steam generated by the exhaust gas boiler 10 of the cogeneration 4 is heated to generate superheated steam.

The internal structure of the combustion type superheated steam generator 23 is not shown in FIG. 3, but it has the structure of a combustion type boiler in which a heat transfer pipe is provided in a combustion chamber. One end of the heat transfer pipe serves as a saturated steam inlet 23a in communication with the exhaust gas boiler 10 via the saturated steam pipe 24, and the other end serves as a superheated steam outlet 23b. The combustion type superheated steam generator 23 is provided with two fuel feeding ports 23c and 23d for a dry-distilled gas and waste oil, and an exhaust gas outlet 23e. The upstream end of an exhaust gas passage 25 is connected to the exhaust gas outlet 23e. On the other hand, the fuel feeding port 23c for a dry-distilled gas is connected to the generated gas outlet 38 of the carbonization furnace 31 via a dry-distilled gas pipe 26. The saturated steam generated in the exhaust gas boiler 10 is passed through the heat transfer pipe, while the dry-distilled gas generated in the carbonization furnace 31 is fed from the fuel feeding port 23c for a dry-distilled gas, and the waste oil is fed from the fuel feeding port 23d for waste oil to the combustion chamber as fuels for combustion. The heat of this combustion heats the saturated steam in the heat transfer pipe to generate atmospheric pressured superheated steam.

In the combustion type superheated steam generator 23, the fuel that is combusted with the dry-distilled gas can be fuel other than the waste oil.

The superheated steam generated in the electrically powered superheated steam generator 12 and the combustion type superheated steam generator 23 are supplied to the superheated steam inlet 37 of the inner housing 33 in the carbonization furnace 31 via the superheated steam pipes 21 and 21, respectively. The carbonization furnace 31 generates the dry-distilled gas and the carbide C by heating the organic substance for carbonization B1 in the superheated steam supplied from the two superheated steam generators 12 and 23 for dry-distillation and carbonization. The space between the outer housing 32 and the inner housing 33 therein constitutes a heating chamber 34.

The generated gas outlet 38 at the outlet end of the inner housing 33 in the carbonization furnace 31 is in communication with the fuel feeding port 23c for dry-distilled gas of the combustion type superheated steam generator 23 via the dry-distilled gas pipe 26.

The organic substance feeding chute 40 and the carbide collecting chute 52 that extend between the upper walls and between the lower walls of the two housing 32 and 33 are shielded from the heating chamber 34 between the two housings 32 and 33. Therefore, the organic substance for carbonization B1 is fed to the inner housing 33 without being contacted with the gas in the heating chamber 34, and the carbide C in the treatment chamber 35 is collected without being contacted with the gas in the heating chamber 34.

An exhaust gas inlet 32a in communication with the heating chamber 34 is opened in the lower wall of the outer housing 32. The exhaust gas inlet 32a is connected to the downstream end of the exhaust gas passage 9 of the engine 5 in the cogeneration 4, and the downstream end of the exhaust gas passage 25 from the exhaust gas outlet 23e of the combustion type superheated steam generator 23. On the other hand, an exhaust gas inlet 32b in communication with the heating chamber 34 is opened in the upper wall of the outer housing 32. The exhaust gas inlet 32b is connected to the exhaust gas passage 58. The exhaust gas that was discharged from the engine 5 of the cogeneration 4 and passed through the exhaust gas boiler 10 and the exhaust gas from the combustion type superheated steam generator 23 are supplied to the heating chamber 34 of the carbonization furnace 31. Then, the superheated steam in the treatment chamber 35 of the carbonization furnace 31 is heated from the surroundings, using the exhaust gas from the former and the latter as the heat source, and then the exhaust gas is discharged to the exhaust gas passage 58.

In this example, a method for resource recovery by carbonizing the organic substance for carbonization B1 with the superheated steam is conducted substantially in the same manner as in Example 1, except for the following points. In the cogeneration 4, the electric power is output by driving the electric generator 6 by the engine 5, and hot water is produced by heating water by heat exchange in the radiator 8. The hot water produced by the radiator 8 of the cogeneration 4 is supplied to the exhaust gas boiler 10, and heated with an exhaust gas with a high temperature (e.g., 800 to 900° C.) from the engine 5 to generate saturated steam.

The saturated steam generated by the exhaust gas boiler 10 is supplied to each of the electrically powered superheated steam generator 12 and the combustion type superheated steam generator 23 as the superheated steam generating means, so that atmospheric or low pressured superheated steam with a temperature of about 100 to 900° C. is generated. In the combustion type superheated steam generator 23, the dry-distilled gas generated in the carbonization furnace 31 and waste oil are supplied as fuels, and combustion of the dry-distilled gas and the waste oil heats the saturated steam from the exhaust gas boiler 10 of the cogeneration 4 to generate atmospheric pressured superheated steam. On the other hand, in the electrically powered superheated steam generator 12, in the same manner as in Example 1, the electric heater 18 is heated by the electric power generated by the electric generator 6 of the cogeneration 4 to store heat energy in the heat storage material 19, and the saturated steam in the heat transfer 17 is heated by the heat energy of the heat storage material 19 so that superheated steam is generated.

In this case, since both the electrically powered superheated steam generator 12 and the combustion type superheated steam generator 23 are used, the saturated steam generated by the exhaust gas boiler 10 is heated not only by the electrically powered superheated steam generator 12, but also by the combustion type superheated steam generator 23 for the generation of the superheated steam, and thus the ability of generating the superheated steam can be improved.

Furthermore, in the combustion type superheated steam generator 23, the dry-distilled gas is combusted together with the waste oil, and thus its heating ability can be improved.

Thus, the superheated steam generated in both the electrically powered superheated steam generator 12 and the combustion type superheated steam generator 23 is supplied to the treatment chamber 35 in the inner housing 33 in the continuous type carbonization furnace 31. In the treatment chamber 35 in the continuous type carbonization furnace 31, the organic substance B1 is heated with the superheated steam in a reducing atmosphere without oxygen at a low temperature and a high calorie for dry-distillation and carbonization, so that the dry-distilled gas and the carbide C are generated.

The dry-distilled gas generated by dry-distillation of the organic substance for carbonization B1 in the carbonization furnace 31 is collected from the generated gas outlet 38. This dry-distilled gas is supplied to the combustion type superheated steam generator 23 and combusted, as described above. This combustion heats the saturated steam generated by the exhaust gas boiler 10 of the cogeneration 4 to generate superheated steam.

Furthermore, the exhaust gas that was subjected to the heating of the hot water in the exhaust gas boiler 10 in the cogeneration 4 and the exhaust gas generated by the combustion of the dry-distilled gas in the combustion type superheated steam generator 23 are supplied to the heating chamber 34 in the carbonization furnace 31, and the heat of the exhaust gas heats the superheated steam in the carbonization furnace 31.

Therefore, in this example, the dry-distilled gas generated in the carbonization furnace 31 can be utilized effectively by combusting in the combustion type superheated steam generator 23 for generation of the superheated steam. In addition, since the dry-distilled gas is combusted, it is ensured that the dry-distilled gas becomes harmless. Furthermore, even if the dry-distilled gas has offensive odor or bad smell, the odor or smell can disappear by heating and combustion (e.g., retention while heating at 800 to 900° C. for two seconds or more).

Furthermore, the exhaust gas generated in the combustion type superheated steam generator 23 and the exhaust gas generated by combustion of a combustible gas in the engine 5 of the cogeneration 4 heat the superheated steam in the carbonization furnace 31. Therefore, the heat energy of these exhaust gases can be utilized effectively as the heat source for heating the superheated steam in the carbonization furnace 31, and thus dry-distillation and carbonization of the organic substance for carbonization B1 in the carbonization furnace 31 can be promoted.

Furthermore, the exhaust gas boiler 10 that utilizes the exhaust gas from the engine 5 of the cogeneration 4 is provided, and this exhaust gas boiler 10 makes it possible for the hot water heated by the radiator 8 to be further heated with the exhaust gas to generate the saturated steam. Thus, further effective utilization of the exhaust gas and energy saving can be achieved.

In Example 3, the electrically powered superheated steam generator 12 is used, but the electrically powered superheated steam generator 12 is not essential. In other words, when a large ability of generating the superheated steam is not required, it is sufficient to use only the combustion type superheated steam generator 23.

EXAMPLE 4

Figure 4:
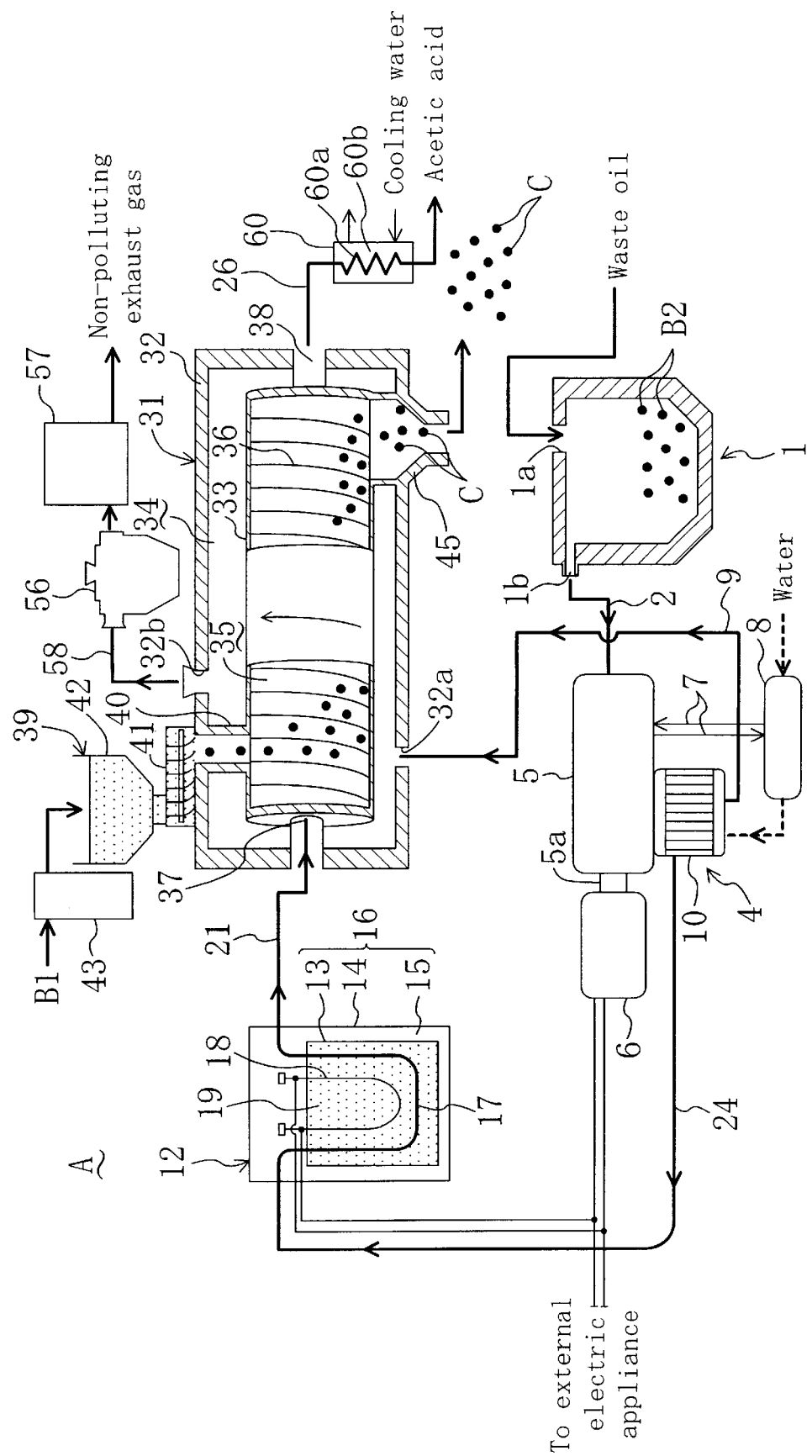
FIG. 4 is a view showing Example 4, corresponding to that shown in FIG. 1.

FIG. 4 shows Example 4. In Example 3, the dry-distilled gas generated in the carbonization furnace 31 is supplied to the combustion type superheated steam generator 23 as a fuel for combustion, whereas in this example, this dry-distilled gas is cooled to generate acetic acid.

In this example, unlike in Example 3, the combustion type superheated steam generator 23 is not provided, and only electrically powered superheated steam generator 12 of a heat storage type is provided as in Example 1. Furthermore, only the exhaust gas from the engine 5 of the cogeneration 4 is supplied to the heating chamber 34 in the carbonization furnace 31.

A condenser 60 as cooling means is connected to the generated gas outlet 38 of the carbonization furnace 31 via the dry-distilled gas pipe 26. This condenser 60 includes a dry-distilled gas pipe 60a and a water passage 60b that surrounds the dry-distilled gas pipe 60a. A dry-distilled gas is introduced to the dry-distilled gas pipe 60a, and the dry-distilled gas is cooled with water in the water passage 60b, so that acetic acid is generated from the dry-distilled gas.

The acetic acid generated from the dry-distilled gas has a different component depending on the organic substance B1 fed to the carbonization furnace 31, but generally can be used as a fertilizer. In addition, when timber is fed as the organic substance for carbonization B1, pyroligneous acid, which is an effective ointment, can be generated.

The dry-distilled gas is generated by heating the organic substance for carbonization B1 in the carbonization furnace 31 with the superheated steam and collected together with steam. Therefore, the acetic acid generated by cooling is clear without turbidity, compared with regular acetic acid obtained by cooling a combustible gas.

As described above, the apparatus A for resource recovery constitutes a part of an apparatus for producing acetic acid by including the condenser 60. The structure other than that is the same as that of Example 3.

Thus, in this example, the dry-distilled gas generated together with carbonization of the organic substance for carbonization B1 in the carbonization furnace 31 is supplied to the condenser 60 and cooled, and acetic acid is generated by the cooling. Thus, the dry-distilled gas can be utilized effectively and can become harmless.

EXAMPLE 5

Figure 5:
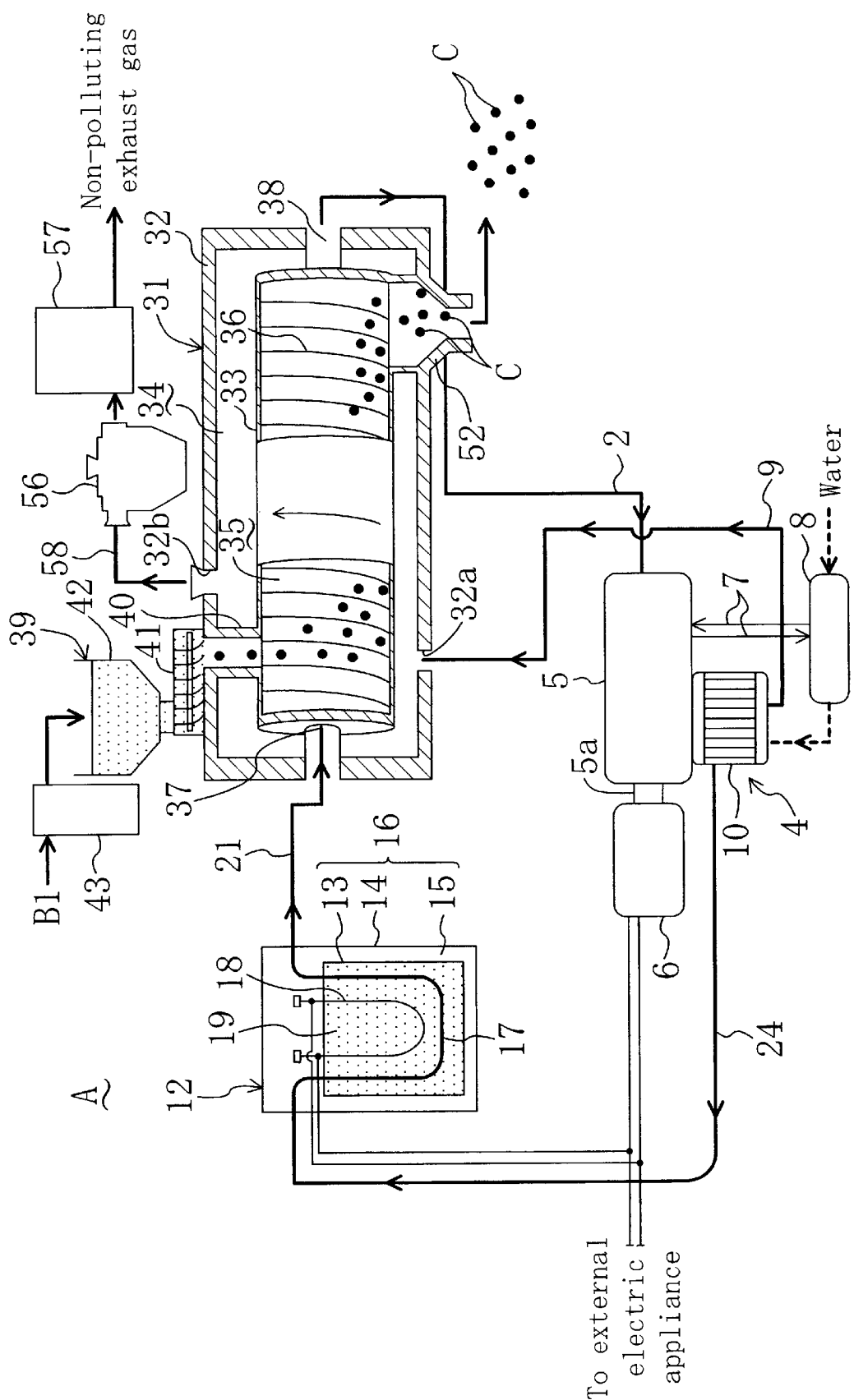
FIG. 5 is a view showing Example 5, corresponding to that shown in FIG. 1.

FIG. 5 shows Example 5. In Example 3, a combustible gas is generated from the organic substance for gasification B2 in the gasification furnace 1, whereas in Example 5, the carbonization furnace 31 also serves as the gasification furnace 1, and the carbide C is generated by carbonizing the organic substance for carbonization B1 in the carbonization furnace 31, and further the carbide C is heated with the superheated steam to generate the combustible gas.

In this example, only electrically powered superheated steam generator 12 of the heat storage type is provided as in Example 4. Furthermore, only the exhaust gas from the engine 5 of the cogeneration 4 is supplied to the heating chamber 34 in the carbonization furnace 31.

Furthermore, the gasification furnace 1 is omitted, and the generated gas outlet 38 of the carbonization furnace 31 is connected directly to the engine 5 of the cogeneration 4 via the gas pipe 2. The heating temperature in the carbonization furnace 31 is set to a high temperature (e.g., 900° C.), compared with that in the above examples. In the carbonization furnace 31, the dry-distilled gas and the carbide C are generated by heating the organic substance for carbonization B1 in the superheated steam, and the carbide C is heated by the superheated steam with a higher temperature to generate the combustible gas containing at least one of hydrogen ($H_2$) and carbon monoxide (CO). Then, the combustible gas as well as the dry-distilled gas are supplied directly to the engine 5 of the cogeneration 4 as fuels. The structure other than is the same as in Example 3.

Therefore, in this example, the carbonization furnace 31 is used also as the gasification furnace, so that heat energy can be utilized further effectively, and the apparatus A can be more compact.

In the case of this example, the carbide C is generated in the carbonization furnace 31 and the carbide C is further heated to generate the combustible gas. Therefore, the carbide C collected from the carbide collecting chute 52 after the combustible gas is generated is difficult to be a commercially viable product, unlike those obtained in the above examples. Furthermore, it is preferable that this carbide C is disposed of, because further gasification is not possible with the carbide C.

EXAMPLE 6

Figure 6:
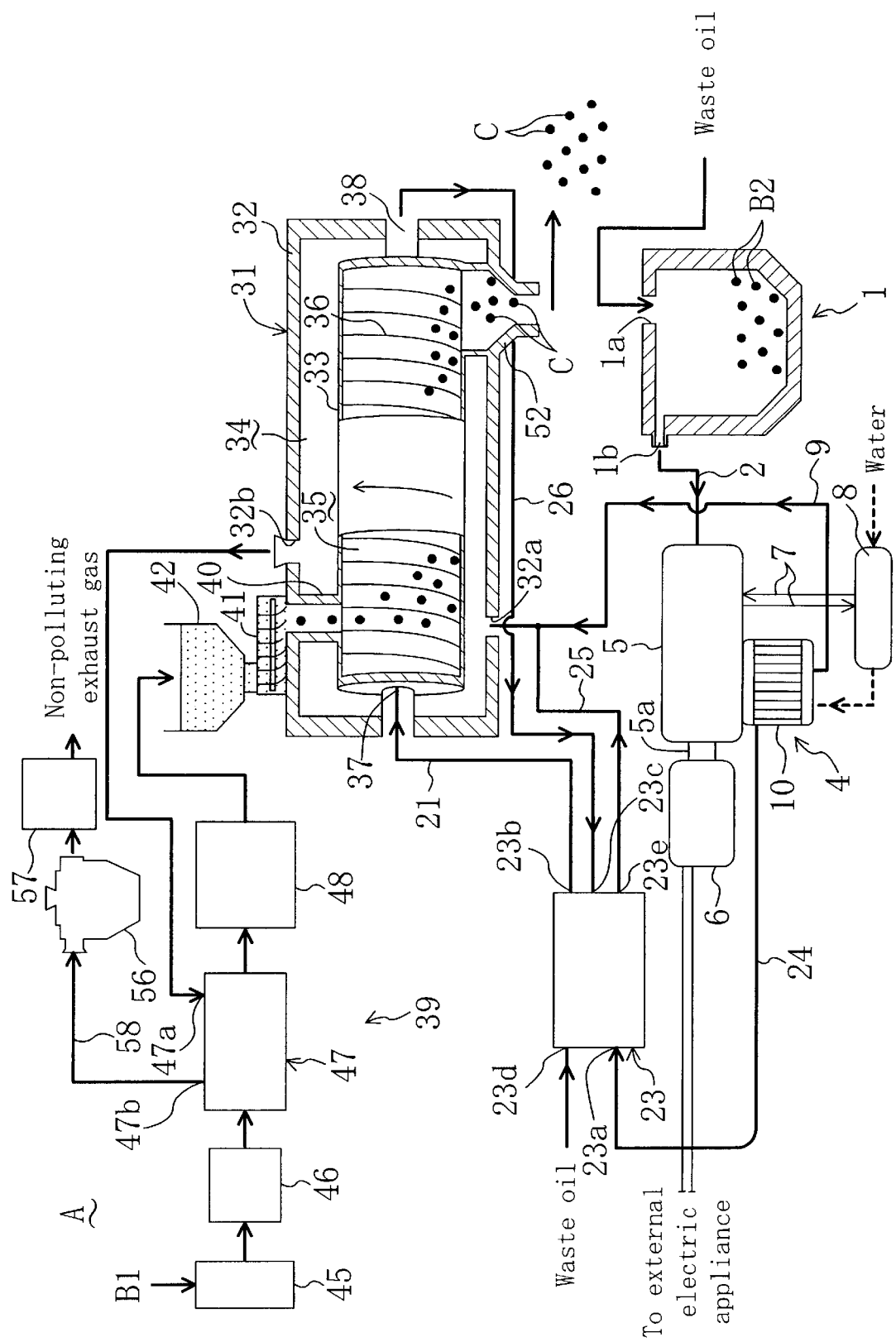
FIG. 6 is a view showing Example 6, corresponding to that shown in FIG. 1.

FIG. 6 shows Example 6, where the organic substance feeding apparatus 39 for feeding the organic substance for carbonization B1 to the carbonization furnace 31 is modified.

In this example, the electrically powered superheated steam generator 12 of the heat storage type is not provided, and only the combustion type superheated steam generator 23 is provided.

Furthermore, the organic substance feeding apparatus 39 includes a dehydrator 45, a constant amount feeder 46, a dryer 47 and a granulator 48 (granulating means) instead of the crusher 43 in the above examples. The dehydrator 45 dehydrates the organic substance for carbonization B1 of untreated wastes or the like. The constant amount feeder 46 feeds the organic substance B1 dehydrated with the dehydrator 45 at a predetermined amount. The dryer 47 dries the organic substance B1 fed from the constant amount feeder 46, and a treatment chamber (not shown) to which the organic substance B1 from the constant amount feeder 46 is introduced is formed in the dryer 47. This treatment chamber is in communication with the exhaust gas inlet 47a connected to the exhaust gas outlet 32b of the carbonization furnace 31 and the exhaust gas outlet 47b connected to the exhaust gas passage 58 having the dust collector 56, and dries the organic substance B1 introduced to the treatment chamber with waste heat of the exhaust gas discharged from the carbonization furnace 31.

Instead of the exhaust gas from the exhaust gas outlet 32b of the carbonization furnace 31, the exhaust gas from the rotary engine 5 of the cogeneration 4 and/or the exhaust gas from the combustion type superheated steam generator 23 can be introduced to the exhaust gas inlet 47a. The steam generated from the organic substance B1 in the dryer 47 can be supplied to the combustion type superheated steam generator 23 and combusted together with the dry-distilled gas from the carbonization furnace 31.

The outlet of the dryer 47 is connected to the hopper 42 in communication with the organic feeding chute 40 of the carbonization furnace 31 via the granulator 48. In this granulator 48, the organic substance for carbonization B1 that has been dried by the dryer 47 is compression-molded to granules having a predetermined size (e.g., preferably about 5 mm to 10 mm in diameter) by the granulator 48 before being fed to the carbonization furnace 31. The structure other than that is the same as in Example 3.

In the case of this example, since the organic substance for carbonization B1 is compression-molded to granules by the granulator 48 before being fed to the carbonization furnace 31, the passage properties and the contact properties of the superheated steam with respect to the organic substance B1 become high in the carbonization furnace 31, so that the carbonization of the organic substance B1 can be effected efficiently. Moreover, the generated carbide C becomes granules, so that the handling properties can be improved.

OTHER EXAMPLES

In Examples 1 to 5, the electrically powered superheated steam generator 12 is of the heat storage type. However, instead of this type, an electric boiler provided with an electric heater for heating hot water by heating the electric heater with the electric power from the electric generator 6 of the cogeneration 4 can be used, when it is necessary to generate a large volume of superheated steam.

Furthermore, although in Examples 3 to 6, the exhaust gas boiler 10 is provided in the cogeneration 4, an integrated unit with the exhaust gas boiler 10 and the combustion type superheated steam generator 23 combined can be used.

Furthermore, in the present invention, each element in the apparatus A for resource recovery is not limited to that shown in the above examples, but any suitable means can be used, as long as it has equivalent effects.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An apparatus for resource recovery from an organic substance for gasification containing biomass by converting energy obtained by gasifying the organic substance for gasification to superheated steam, comprising:

a gasification furnace for generating a combustible gas containing at least one of hydrogen and carbon monoxide from the organic substance for gasification;

a cogeneration including an engine that uses the combustible gas generated by the gasification furnace as a fuel, an electric generator driven by the engine, and a radiator for generating hot water by heating water by cooling the engine;

superheated steam generating means for generating superheated steam from the hot water generated by the radiator of the cogeneration; and a carbonization furnace for generating a dry-distilled gas and a carbide by heating an organic substance for carbonization containing biomass in the superheated steam generated by the superheated steam generating means;

wherein the superheated steam generated by the superheated steam generating means is supplied to another apparatus.

2. An apparatus for resource recovery by carbonizing an organic substance for carbonization containing biomass with superheated steam, comprising:

a cogeneration including an engine that uses a combustible gas containing at least one of hydrogen and carbon monoxide as a fuel, an electric generator driven by the engine, and a radiator for generating hot water by heating water by cooling the engine;

superheated steam generating means for generating superheated steam from the hot water generated by the radiator of the cogeneration; and a carbonization furnace for generating a dry-distilled gas and a carbide by heating the organic substance for carbonization in the superheated steam generated by the superheated steam generating means and generating the combustible gas by heating the carbide in the superheated steam.

3. The apparatus for resource recovery from an organic substance according to any one of claims 1 to 2, wherein the superheated steam generating means is constituted by an electrically powered superheated steam generator that uses electric power generated by the electric generator of the cogeneration as heating energy.

4. The apparatus for resource recovery from an organic substance according to claim 1 or 2, wherein the superheated steam generating means is constituted by a combustion type superheated steam generator that generates superheated steam from hot water by combusting the dry-distilled gas generated in the carbonization furnaces.

5. The apparatus for resource recovery from an organic substance according to claim 1 or 2, wherein the superheated steam generating means is constituted by an electrically powered superheated steam generator that uses electric power generated by the electric generator of the cogeneration as heating energy and a combustion type superheated steam generator that generates superheated steam from hot water by combusting the dry-distilled gas generated in the carbonization furnace.

6. The apparatus for resource recovery from an organic substance according to claim 5, wherein the carbonization furnace is configured so as to heat superheated steam using at least one of an exhaust gas from the engine of the cogeneration and an exhaust gas from the combustion type superheated steam generator as a heat source.

7. The apparatus for resource recovery from an organic substance according to claim 3, wherein the electrically powered superheated steam generator is of a heat storage type in which a heat transfer pipe and an electric heater are provided in a high temperature heat storage reservoir having a heat storage material.

8. The apparatus for resource recovery from an organic substance according to claim 4, wherein the combustion type superheated steam generator combusts the dry-distilled gas together with another fuel.

9. The apparatus for resource recovery from an organic substance according to claim 1 or 2, comprising cooling means for generating acetic acid by cooling the dry-distilled gas generated in the carbonization furnace.

10. The apparatus for resource recovery from an organic substance according to claim 1, wherein at least apart of the carbide generated by the carbonization furnace is supplied to the gasification furnace.

11. The apparatus for resource recovery from an organic substance according to any one of claims 1 to 2, comprising an exhaust gas boiler for generating saturated steam by heating hot water generated by the radiator of the cogeneration with an exhaust gas from the engine.

12. The apparatus f or resource recovery from an organic substance according to any one of claims 1 to 2, wherein the engine of the cogeneration is a rotary engine.

13. The apparatus for resource recovery from an organic substance according to claim 1 or 2, wherein the carbonization furnace is a continuous type carbonization furnace.

14. The apparatus for resource recovery from an organic substance according to claim 1 or 2, comprising granulating means for previously molding the organic substance for carbonization into granules before being fed to the carbonization furnace.

15. The apparatus for resource recovery from an organic substance according to claim 1, wherein the organic substance for gasification to be fed to the gasification furnace is at least one selected from the group consisting of organic resources, carbides, wood and other organic wastes.

16. The apparatus for resource recovery from an organic substance according to claim 1 or 2, wherein the organic substance for carbonization to be fed to the carbonization furnace is at least one selected from the group consisting of agricultural wastes including chaff and straw, livestock wastes including fowl droppings and droppings of pigs and cattle, forestry wastes including lumber from thinning, waste wood and bamboo, industrial wastes discharged in a food production process, a brew process or a lumber production process, domestic wastes including food refuse, domestic garbage and waste edible oil, organic resources, waste rubber materials and resins including fiber reinforced resins.

17. The apparatus for resource recovery from an organic substance according to any one of claims 1 to 2, wherein electric power generated by the electric generator of the cogeneration is supplied to the outside.

18. The apparatus for resource recovery from an organic substance according to claim 1 or 2 wherein a temperature of the superheated steam when generating a carbide from the organic substance for carbonization in the carbonization furnace is 400° C. or less.

19. A method for resource recovery by carbonizing an organic substance for carbonization containing biomass with superheated steam, comprising:

a gasification step of generating a combustible gas containing at least one of hydrogen and carbon monoxide from an organic substance for gasification containing biomass;

a cogeneration step of operating an engine of a cogeneration using the combustible gas as a fuel to drive an electric generator by the engine and generating hot water by heating water in a radiator;

a superheated steam generation step of generating superheated steam from the hot water generated by the radiator; and a carbonization step of generating a dry-distilled gas and a carbide by heating the organic substance for carbonization in the superheated steam.

20. A method for resource recovery by carbonizing an organic substance for carbonization containing biomass with superheated steam, comprising:

a cogeneration step of operating an engine of a cogeneration using a combustible gas containing at least one of hydrogen and carbon monoxide as a fuel to drive an electric generator by the engine and generating hot water by heating water in a radiator;

a superheated steam generation step of generating superheated steam from the hot water generated by the radiator; and a carbonization step of generating a dry-distilled gas and a carbide by heating the organic substance for carbonization in the superheated steam and generating a combustible gas by heating the carbide in the superheated steam.

21. The method for resource recovery from an organic substance according to claim 19 or 20, wherein in the superheated steam generation step, the superheated steam is generated from the hot water using electric power generated by the electric generator of the cogeneration as heating energy.

22. The method for resource recovery from an organic substance according to claim 19 or 20, wherein in the superheated steam generation step, the superheated steam is generated from hot water by combustion of the dry-distilled gas generated in the carbonization step as heating energy.

23. The method for resource recovery from an organic substance according to claim 19, wherein at least a part of the carbide generated in the carbonization step is used as a carbide in the gasification step.

24. The method for resource recovery from an organic substance according to claim 19 or 20, wherein in the superheated steam generation step, the saturated steam is generated by heating hot water generated by the radiator of the cogeneration with an exhaust gas from the engine.

25. The method for resource recovery from an organic substance according to claim 19 or 20, wherein the organic substance for carbonization is previously molded into granules before being heated with the superheated steam in the carbonization step.

26. The method for resource recovery from an organic substance according to claim 19 or 20, wherein the organic substance for gasification used for generating the combustible gas in the gasification step is at least one selected from the group consisting of organic resources, carbides, wood and other organic wastes.

27. The method for resource recovery from an organic substance according to claim 19 or 20, wherein the organic substance for carbonization heated in the carbonization step is at least one selected from the group consisting of agricultural wastes including chaff and straw, livestock wastes including fowl droppings and droppings of pigs and cattle, forestry wastes including lumber from thinning, waste wood and bamboo, industrial wastes discharged in a food production process, a brew process or a lumber production process, domestic wastes including food refuse, domestic garbage and waste edible oil, organic resources, waste rubber materials and resins including fiber reinforced resins.

28. The method for resource recovery from an organic substance according to claim 19 or 20, wherein a temperature of the superheated steam when generating a carbide from the organic substance for carbonization in the carbonization step is 400° C. or less.

* * * * *

UNITED STATES PATENT AND TRADEMARK OFFICE
CERTIFICATE OF CORRECTION

PATENT NO. : 6,474,067 B2
DATED : November 5, 2002
INVENTOR(S) : Hiromu Shishido and Norio Omoda It is certified that error appears in the above-identified patent and that said Letters Patent is hereby corrected as shown below:

Column 19,
Line 46, change "furnaces" to -- furnace --

Column 20,
Line 10, change "apart" to -- a part --

Signed and Sealed this

Fifteenth Day of July, 2003

JAMES E. ROGAN
*Director of the United States Patent and Trademark Office*